United States Patent
Van Blokland

(10) Patent No.: US 12,041,941 B2
(45) Date of Patent: Jul. 23, 2024

(54) METHOD AND DEVICE FOR CREATING AN INVERTED PUFF PASTRY DOUGH OR A CROISSANT DOUGH

(71) Applicant: Radie B.V., Culemborg (NL)

(72) Inventor: Johannes Josephus Antonius Van Blokland, Culemborg (NL)

(73) Assignee: RADIE B.V., Culemborg (NL)

( * ) Notice: Subject to any disclaimer, the term of this patent is extended or adjusted under 35 U.S.C. 154(b) by 54 days.

(21) Appl. No.: 17/708,086

(22) Filed: Mar. 30, 2022

(65) Prior Publication Data
US 2022/0312780 A1 Oct. 6, 2022

(30) Foreign Application Priority Data
Mar. 31, 2021 (NL) .................................. N2027885

(51) Int. Cl.
*A21D 13/16* (2017.01)
*A21C 3/06* (2006.01)

(52) U.S. Cl.
CPC ................ *A21D 13/16* (2017.01); *A21C 3/06* (2013.01)

(58) Field of Classification Search
CPC ...................................................... A21D 13/16
See application file for complete search history.

(56) References Cited

U.S. PATENT DOCUMENTS

| | | | |
|---|---|---|---|
| 2,264,115 A | 11/1941 | Freder et al. | |
| 2,888,888 A | 6/1959 | Jorgenson | |
| 4,276,317 A | 6/1981 | Hayashi | |

(Continued)

FOREIGN PATENT DOCUMENTS

| | | |
|---|---|---|
| EP | 0005570 B1 | 11/1981 |
| FR | 2532819 A1 | 3/1984 |

(Continued)

OTHER PUBLICATIONS

Paris Sweets in Seattle, "Inside-Out Puff Pastry". Available online as of Feb. 21, 2010 from https://parissweetsinseattle.blogspot.com. pp. 1-8. (Year: 2010).*

(Continued)

*Primary Examiner* — Jenna A Watts
(74) *Attorney, Agent, or Firm* — The Dobrusin Law Firm, P.C.

(57) ABSTRACT

The present invention relates to a method for creating a inverted puff pastry dough or croissant dough, comprising the steps of:

A. Creating a laminate extending in a length ad a width direction by:
   A1. Providing a first layer of a mixture of fat such as margarine or butter and flour or starch on a substrate;
   A2. Providing at least one layer of dough on top of the mixture;
   A4. Providing a second layer of a mixture of dough and flour or starch on top of the dough layer;
C. Cutting the thus obtained laminate in the width direction, as to obtain multiple laminate pieces;
D. Stacking the laminate pieces in a partly-overlapping manner in the length direction, while essentially outlining them in the width direction; and
E. Rolling the stack a first time in a rolling direction in or against the length direction, thus obtaining a inverted puff pastry dough or croissant dough.

9 Claims, 2 Drawing Sheets

(56) References Cited

U.S. PATENT DOCUMENTS 5,182,124 A    1/1993  Kageyama

FOREIGN PATENT DOCUMENTS

GB   507859 A    6/1939
GB   1290704 A   9/1972

OTHER PUBLICATIONS

Van Damme, "Inverse Puff Pastry". Available online as of Mar. 7, 2011 from https://chefeddy.com. pp. 1-6. (Year: 2011).*
Fletcher, "A Discussion of Laminated Doughs—Pastries like a pro". Available online as of Sep. 6, 2016 from https://pastrieslikeapro.com. pp. 1-22. (Year: 2016).*
Extended European Search Report dated Aug. 9, 2022, Application No. 22163119.5.

* cited by examiner

METHOD AND DEVICE FOR CREATING AN INVERTED PUFF PASTRY DOUGH OR A CROISSANT DOUGH

Traditional puff pastry (also called puff pastry) is a laminate made of layers of a base dough and layers of fat such as margarine or butter. All types of puff pastry area so-called "turned or laminated doughs". This means that most commonly, it is made by applying a layer of a certain fat on and between a layer of base dough, and then rolling it (i.e. reducing the package in thickness) generally followed by folding it over to make a number of layers. This is why this is called "turning" in baker's jargon and in the industrial sector this is called lamination.

The base dough generally comprises flour, water, salt and a little fat which may be butter, margarine or (derived from) some leftover dough. The left-over dough will be further referred to as scrap dough. A layer of a selected fat may be placed on top of the base dough. The layer of base dough is preferably completely wrapped around the fat layer.

The thus obtained assembly is rolled out into a pronounced thin sheet that is at least three times as long as its initial length, and then folded in thirds or quarters into a square. This can produce several layers of base dough and fat. This assembly is put to rest, preferably in a refrigerated environment, for a short time, and preferably repeatedly rolled out into a rectangle and folded back and laid to rest. Rolling out may be done at a temperature of 8-20° C. depending on the fat used.

This traditional puff pastry is a chewy dough. During the baking process, the layers of fat melt into the dough. The water contained in the fat and the fat evaporates, becomes steam and air accumulations arise between the layers of puff pastry dough. The layers harden and thus retain their 'blown' shape. This gives baked puff pastry its airy character. Baked puff pastry is brittle and it flakes easily.

Puff pastry that is processed to make croissants is called Danish pastry, or Wienerbrød or Viennoiserie. Making traditional puff pastry is quite laborious. That is why there were also variants developed that take less time. The fat may for instance be crumbled directly into the base dough, in the kneading phase, instead of folding the base dough around a layer of fat. Such quick puff pastry variant is called the Scottish method, coarse puff pastry, puff pastry or blitz dough in English. In French it is called feuilletage minute. The two abovedescribed methods, traditional or quick method puff pastry dough have already been applied at an industrial scale as well.

There is yet an alternative way of making puff pastry which is called inverse puff pastry. When making this type of inverse puff pastry, instead of wrapping base dough around fat or butter, the base dough is wrapped by the layer of fat or butter. Since the fat is on the outside in this process, the inverse puff pastry dough is sticky on the outside and therefore difficult to handle in an automated manner. However, there is a demand for this type of puff pastry, for instance for creating French products called Galette des Rois, Chaussons aux pommel, plaques de mille-feuilles.

It is therefore an object of the present invention to provide a method and device for producing inverse puff pastry dough and inverse dough for making croissants at an industrial scale.

The invention thereto proposes a method for creating an inverse puff pastry and/or inverse croissant dough, comprising the steps of:
A. Creating a laminate extending in a length ad a width direction by:
   A1. Providing a first layer of a mixture of fat such as margarine or butter and flour or starch on a substrate;
   A2. Providing at least one layer of base dough on top of the mixture;
   A4. Providing a second layer of a mixture of fat such as margarine or butter and flour or starch on top of the dough layer;
B. Cutting the thus obtained laminate in the width direction, as to obtain multiple laminate pieces;
C. Stacking the laminate pieces in a partly-overlapping manner in the length direction, while essentially outlining them in the width direction; and
E. Rolling the stacked laminate pieces a first time in a rolling direction in or against the length direction, thus obtaining a inverted puff pastry dough or a croissant dough.

The method according to the invention takes away the difficulty of wrapping a layer of base dough in fat or butter, which is a difficult step to perform in an automated manner since the butter is sticky and slippery and may pollute the machinery. Stacking the layers has proved to be a useful alternative step that allows automation of inverted puff pastry creation. Stacking, means applying layers on top of each other, and it is done in a partly overlapping manner. With partly overlapping in the sense of the present invention, only partly overlapping is meant, so this implies also partly-not overlapping. The laminate pieces are arranged in a roof-tile-wise manner, that is partly covering an adjacent piece and partly covered by another adjacent piece.

Rolling (meaning; reducing thickness) the stacked laminate pieces may in particular be done by a number of cylinders or rollers arranged on a carousel, known in the art as a quick reductor, quick reducer, multi-roller or satellite head. Rolling may take place in the direction of conveyance or against this direction. In a preferred embodiment, step B is preceded by a step A5. of rolling the thus obtained laminate.

In a preferred embodiment, the invention comprises a step D. of adding flour or starch on top of the laminate pieces stacked in step C before Rolling the stacked laminate pieces according to step E. This way, the flour or starch covers the cuts made during stacking. These surfaces tend to be especially sticking so that it is beneficial to add or even heap up some flour or starch there.

Next steps according to the present invention may be F. Flipping over the inverse puff pastry dough or croissant dough and G. Depositing the inverse puff pastry dough or croissant dough on a preferably pre-floured or pre-starched substrate. Flipping over the inverse puff pastry dough or croissant dough allows to roll the dough from the opposite side too, which leads to a better texture of the laminate layers. The substrate may be a conveyor, which may be pre-floured or pre-starched in order to avoid sticking of the dough onto it.

The method according to the invention may further comprise the step H. of rolling the inverted puff pastry or croissant dough in the rolling direction in or against the length direction.

In yet a further embodiment, step A1 of providing a first layer of a mixture of fat such as margarine or butter and flour or starch comprises kneading fat such as margarine or butter and flour or starch in a ratio of at least 4 and preferably at least 3 to 1. This may be done in a so called spiral kneader, for instance during not more than 500 turns, while gradually adding the flour to the fat such as margarine or butter. It is a goal to knead as short as possible, in order not to include air in the mixture.

The invention may further comprise the step A3 of providing at least one layer of scrap dough on top of layer of base dough before step A4 of providing a second layer of a mixture of base dough and flour on top of the dough layer. Re-using scrap dough not only prevents waste of food products, but also leads to a mixture that has appeared to have suitable properties for forming puff pastry.

The invention further relates to a device for creating a inverted puff pastry dough or croissant dough, comprising a first conveyor belt, configured for conveying a dough laminate in a direction of conveyance, a first dispenser, for providing a first layer of a mixture of fat such as margarine or butter and flour on the first conveyor belt, a second dispenser, arranged downstream of the first dispenser, for providing a layer of base dough on top of the mixture, a third dispenser, arranged downstream of the second dispenser, for providing a second layer of a mixture of fat such as margarine or butter and flour on top of the layer of dough, cutting means, for cutting the thus obtained laminate in a direction perpendicular or with a directional component perpendicular to the direction of conveyance, as to obtain multiple dough pieces, a stacker, for stacking the cut laminate pieces in a partly-overlapping manner in de length direction, while essentially outlining them in the width direction and at least one roller, for rolling the stacked laminate pieces for obtaining a inverted puff pastry dough or croissant dough.

The first or the third dispenser may preferably comprise a vacuum pump. This type of pump is characterised in that it avoids air to be enclosed in the mixture during pumping. A vacuum pump has proved to deliver a constant layer of the mixture, without holes or other undesired effects of enclosed air. Similar pumps for fat such as margarine or butter and/or (scrap) dough having this property may be applied too.

The stacker may comprise conveyor belt with a retractable nose belt for placing the cut dough pieces on a subsequent conveyor positioned under the retractable head end of the first conveyor, or another suitable configuration for taking over laminate pieces from the first conveyor to a subsequent conveyor may be applied, such as one with a straight angle or curve to place the dough pieces on a lower positioned subsequent conveyor.

In a preferred embodiment, the device according to the invention comprises a second conveyor belt, extending below the first conveyor belt and configured for receiving a dough laminate from the first conveyor belt, wherein the device is configured for depositing the dough laminate upside down at a flipping location on the second conveyor belt with respect to its orientation on the first conveyor belt.

The device according to the invention may further comprise at least one of a flour or starch dispenser arranged above the first conveyor, downstream the first dispenser or arranged above the first conveyor or downstream the stacker, and in that case preferably before a first roller or rolling module and a flipping location. The device may further comprise a flour or starch dispenser arranged above the second conveyor, upstream the flipping location.

In a further embodiment, the device comprises a second roller, for rolling the inverted puff pastry dough or croissant dough in a direction of or against the direction of conveyance. Furthermore a fourth dispenser may be present, arranged downstream of the second dispenser and upstream of the third dispenser, for providing a layer scrap dough on top of the layer of base dough.

In those cases where the dough is used for making croissants or Viennoiserie products, suitable dough pieces, such as essentially rectangular, triangular or trapezoid pieces may be cut from the thus obtained dough, which pieces may be rolled, stretched, folded and/or stacked and in some cases subsequently bent. A final step of baking the products may be applied.

The invention will now be elucidated into more detail with reference to the following figures, wherein.

Figure 1:
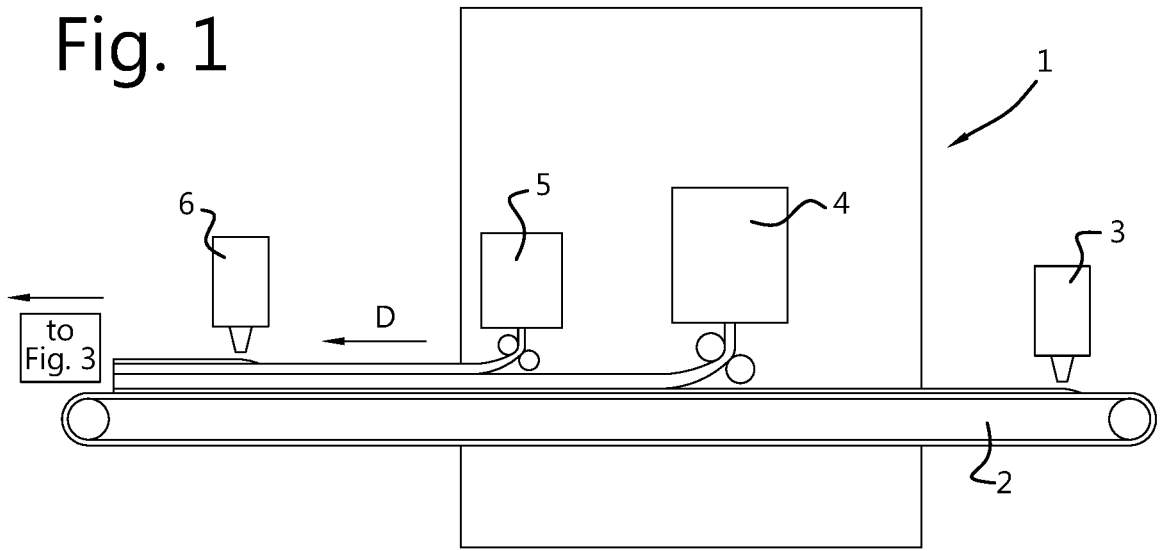
FIG. 1 shows a first part of a device according to the invention.

FIG. 1 shows a first part of a device 1 according to the invention comprising a first conveyor belt 2, configured for conveying a dough laminate in a direction D of conveyance which is as a result also the downstream direction, a first dispenser 3, for providing a first layer of a mixture of fat such as margarine or butter and flour or starch on the first conveyor belt 2, a second dispenser 4, arranged downstream of the first dispenser 3, for providing a layer of base dough on top of the mixture, a third dispenser 6, arranged downstream of the second dispenser 4, for providing a second layer of a mixture of fat such as margarine or butter and flour or starch on top of the layer of dough. Also shown is a fourth dispenser 5, arranged downstream of the second dispenser 4 and upstream of the third dispenser 6, for providing a layer scrap dough on top of the layer of base dough.

Figure 2:
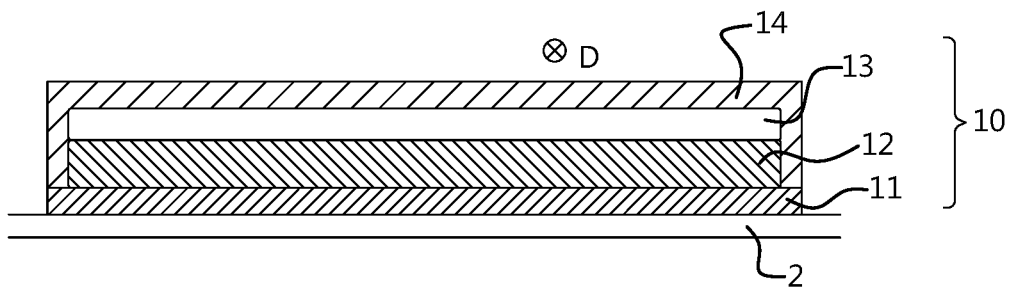
FIG. 2 show the result of the method steps performed by the device from FIG. 1.

FIG. 2 show the result of the method steps performed by the device from FIG. 1. A laminate 10 is obtained, comprising a first layer 11 of a mixture of fat such as margarine or butter and flour or starch, one layer 12 of base dough on top of the mixture; one layer of scrap dough 13 on top of the dough and another layer 14 of a mixture of fat such as margarine or butter and flour or starch, covering both dough layers 12, 13.

Figure 3:
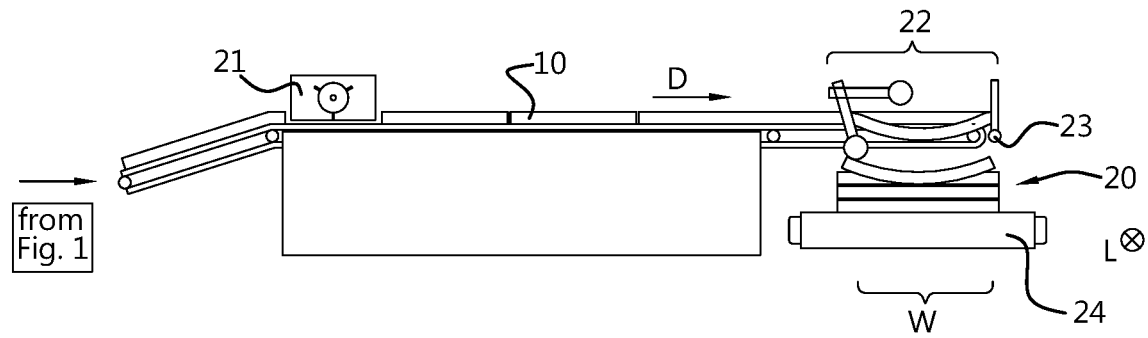
FIG. 3 shows a second part of a device according to the invention.

FIG. 3 shows a second part 20 of a device according to the invention, comprising cutting means 21, for cutting the thus obtained laminate 10 in a direction perpendicular or with a directional component perpendicular to the direction of conveyance D, as to obtain multiple laminate pieces. The device further comprises a stacker 22, for stacking the laminate pieces in a partly-overlapping manner in the length direction L (which is a direction into the paper here), while essentially outlining them in the width direction W. The stacked laminate pieces 33 are then further conveyed on subsequent conveyor 24.

Figure 4:
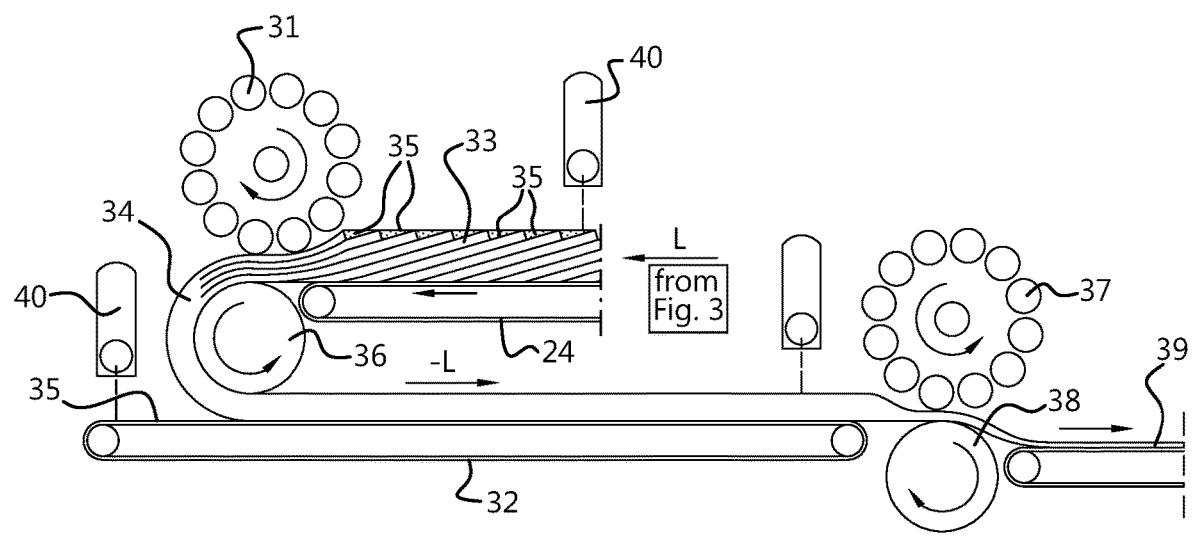
FIG. 4 shows a third part of a device according to the invention.

FIG. 4 shows a third part of a device according to the invention comprising a roller 31, for rolling the stacked laminate pieces 33 received for obtaining a puff pastry dough or croissant dough 34. The inverted puff pastry dough or croissant dough is then turned upside down onto a second conveyor belt 32, at and by means of a conveyor nose bar 36. The inverted puff pastry dough or croissant dough 34 tends to stick to the subsequent conveyor 24. In order to prevent sticking onto the second conveyor belt 32, flour or starch dispensers or sifters 40 are present, to provide the puff pastry dough 34 and the second conveyor 32 belt with a layer of flour or starch 35. The nose bar 36 forms the flipping location referred to in this application.

The device further comprises a second roller 37, positioned on top of a third roller 38 positioned between the second conveyor belt 32 and a third conveyor belt 39, for rolling the puff pastry a second time and further reducing its thickness. Rollers 31 and 37 are known in the art as a quick reductor, quick reducer, multi-roller or satellite head. Arrows indicate their direction of rotation in use.

The above embodiments are examples only and do not limit the scope of the invention as defined in the following claims.

The invention claimed is:

1. A method for creating an inverted puff pastry dough or croissant dough, comprising the steps of:
    A) creating a laminate extending in a length direction and a width direction by:
        A1) providing a first layer of a first mixture of fat, including margarine or butter, and flour or starch on a substrate;
        A2) providing at least one layer of base dough on top of the first mixture;
        A4) providing a second layer of a second mixture of fat, including margarine or butter, and flour or starch on top of the at least one layer of base dough;
    B) cutting the laminate in the width direction, as to obtain multiple laminate pieces;
    C) stacking the multiple laminate pieces in a partly-overlapping manner in the length direction, while essentially outlining them in the width direction; and
    E) rolling the stacked multiple laminate pieces a first time in a rolling direction in or against the length direction, thus obtaining an inverted puff pastry or croissant dough.

2. The method according to claim 1, wherein the step B) is preceded by a step:
    A5) rolling the thus obtained laminate.

3. The method according to claim 1, comprising a step of:
    D) adding flour or starch on top of the multiple laminate pieces stacked in the step C) before rolling the stacked multiple laminate pieces according to the step E).

4. The method according claim 1, comprising steps of:
    F) flipping the inverted puff pastry dough or croissant dough;
    G) depositing the inverted puff pastry dough or croissant dough on a pre-floured substrate.

5. The method according to claim 4, comprising a step of:
    H) rolling the inverted puff pastry dough or croissant dough in the rolling direction in or against the length direction.

6. The method according to claim 4, wherein the step A1) of providing the first layer of the mixture of fat, including margarine or butter, and flour or starch comprises the step of kneading the mixture of fat, including margarine or butter, and flour or starch in a ratio of at least 3 to 1.

7. The method according to claim 4, comprising a step:
    A3) providing at least one layer of scrap dough on top of the at least one layer of base dough before the step A4) of providing the second layer of the second mixture of fat, including margarine or butter, and flour or starch on top of the at least one layer base dough.

8. The method according to claim 6 wherein the step A1) of providing a first layer of the mixture of fat, including margarine or butter, and flour or starch comprises the step of kneading the fat, including margarine or butter, and flour or starch in a ratio of at least 4 to 1.

9. The method according to claim 1, wherein the multiple laminate pieces have a generally equal length and width.

* * * * *